US009665228B2

(12) United States Patent
Feng et al.

(10) Patent No.: US 9,665,228 B2
(45) Date of Patent: May 30, 2017

(54) CONDUCTIVE BRIDGING METHOD, BRIDGING STRUCTURE, TOUCH PANEL AND TOUCH CONTROL DISPLAY APPARATUS

(71) Applicants: Boe Technology Group Co., Ltd., Beijing (CN); Ordos Yuansheng Optoelectronics Co., Ltd., Inner Mongolia (CN)

(72) Inventors: Xiang Feng, Beijing (CN); Xiangdong Wei, Beijing (CN); Jing Liu, Beijing (CN); Yun Qiu, Beijing (CN)

(73) Assignees: Boe Technology Group Co., Ltd., Beijing (CN); Ordos Yuansheng Optoelectronics Co., Ltd., Inner Mongolia (CN)

( * ) Notice: Subject to any disclaimer, the term of this patent is extended or adjusted under 35 U.S.C. 154(b) by 0 days.

(21) Appl. No.: 14/913,298

(22) PCT Filed: Jul. 17, 2015

(86) PCT No.: PCT/CN2015/084334
§ 371 (c)(1),
(2) Date: Feb. 19, 2016

(87) PCT Pub. No.: WO2016/150039
PCT Pub. Date: Sep. 29, 2016

(65) Prior Publication Data
US 2017/0038865 A1    Feb. 9, 2017

(30) Foreign Application Priority Data

Mar. 26, 2015 (CN) .......................... 2015 1 0138235

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 3/0412* (2013.01)

(58) Field of Classification Search
CPC ......... G06F 3/044; G06F 3/041; G06F 3/0412
(Continued)

(56) References Cited

U.S. PATENT DOCUMENTS 4,949,162 A * 8/1990 Tamaki ............... H01L 23/5222
257/499
9,194,985 B1 * 11/2015 Feng ................. G02F 1/133516
(Continued)

FOREIGN PATENT DOCUMENTS

CN            1425204       6/2003
CN          101963713       2/2011
(Continued)

OTHER PUBLICATIONS

International Search Report and Written Opinion from PCT/CN15/84334 dated Jan. 11, 2016.

*Primary Examiner* — Fred Tzeng
(74) *Attorney, Agent, or Firm* — Calfee, Halter & Griswold LLP

(57) ABSTRACT

The present invention relates to the technical field of display by a touch screen, and particularly relates to a conductive bridging method, a bridging structure, a touch panel and a touch control display apparatus. The conductive bridging method comprises: sequentially forming an insulating layer and a self-assembled-monolayer on the base substrate provided with first electrode lines and second electrode lines which mutually intersect; forming via holes penetrating through the insulating layer and the self-assembled-monolayer; removing the self-assembled-monolayer between two adjacent via holes close to a same first electrode line; and forming a conductive film in the via holes and in a region between two adjacent via holes. In this way, a bridging
(Continued)

connection is achieved with the help of the electrical conductivity of the conductive film.

20 Claims, 6 Drawing Sheets

(58) Field of Classification Search
USPC .......................................................... 345/174
See application file for complete search history.

(56) References Cited

U.S. PATENT DOCUMENTS

| | | | |
|---|---|---|---|
| 2006/0146256 A1* | 7/2006 | Ahn .................. | G02F 1/134309 349/141 |
| 2008/0224125 A1* | 9/2008 | Tanabe ................ | H01L 51/0516 257/40 |
| 2015/0122771 A1* | 5/2015 | Teramoto .............. | G06F 3/0412 216/17 |
| 2015/0123117 A1* | 5/2015 | Ito ....................... | H01L 27/1222 257/43 |

FOREIGN PATENT DOCUMENTS

| | | |
|---|---|---|
| CN | 104679343 | 6/2015 |
| KR | 20130114821 | 10/2013 |

* cited by examiner

CONDUCTIVE BRIDGING METHOD, BRIDGING STRUCTURE, TOUCH PANEL AND TOUCH CONTROL DISPLAY APPARATUS

The present application is the U.S. national phase entry of PCT/CN2015/084334, with an international filling date of Jul. 17, 2015, which claims the benefit to Chinese Patent Application No. 201510138235.1, filed on Mar. 26, 2015, the entire disclosures of which are incorporated herein by reference.

RELATED APPLICATIONS

This application claims the priority to Chinese Patent Application No. 201510138235.1, filed on Mar. 26, 2015, which is incorporated herein by reference.

TECHNICAL FIELD

The present invention relates to the technical field of display by a touch screen, and particularly relates to a conductive bridging method, a bridging structure, a touch panel and a touch control display apparatus.

BACKGROUND ART

As a dependence of people on a mobile product has increased, touch screen technologies, including an original resistive touch screen, as well as newest outboard full-fit touch screen, on-cell (a touch sensor is assembled on a liquid crystal panel), HIC, full in cell (a touch sensor is embedded inside a display screen), and the like, have advanced rapidly. In these touch screen technologies, a self-capacitance type capacitive touch screen and a mutual-capacitance type capacitive touch screen are most widely used. In a traditional touch screen technology, the required sensor patterns in X, Y directions are obtained by evaporating and coating ITO on glass and then performing etching, wherein the sensor pattern in Y direction is continuously arranged, and the sensor pattern in X direction are made in a bridging manner.

With regard to a bridging process for receivers (Rx) and transmitters (Tx) of a touch screen, a bridging electrode needs to connect two X-direction electrodes located at two sides of a Y-direction electrode, and can not enable the Y-direction electrode and the X-direction electrode to communicate. As such, it is necessary to first prepare an insulating layer at an intersection position of Y and X directions, and then perforate via holes through the insulating layer above two electrode patterns in X direction, and finally enable the bridging electrode to connect the two electrode patterns in X direction through via holes, thereby achieving bridging. Therefore, the bridging process for the electrode patterns in X and Y directions is essentially a patterning process for an electrode material. The patterning process for most traditional electrode material includes a photo etching process and an etching process.

In a traditional metal bridging process, the process complexity is increased due to processes such as evaporation coating, photoresist-applying, developing and etching of a metal target material. Moreover, in an etching process, the metal electrode is likely to be etched because the alignment is not precise enough, or the metal electrode may be broken, thereby causing a reduction in yield. Therefore, a new process capable of reducing the process difficulty and improving the yield of the touch screen is particularly important.

With regard to a patterning process for the electrode material, ink-jet printing may also be employed. Although the ink-jet printing is a good way for patterning, in view of industrialized mass production, problems such as a size of the ink head, a dribbling amount and the operation continuity for ink-jet printing have always been a bottleneck required to be solved. Particularly, once a liquid drop deviates or displaces, Rx and Tx may be likely to be connected together due to a spreading problem and a film-forming uncertainty after the liquid drop dribbles. In the prior art, a silk-screen printing machine is also used to realize patterning for the electrode material, but it is found in actual processing that, the silk-screen printing machine is high in input cost, and high in pattern typesetting cost. In addition, the precision of a silk screen also affects the resolution.

SUMMARY OF THE INVENTION

An objective of the present invention is to provide a conductive bridging method, a bridging structure, a touch panel and a touch control display apparatus, so as to overcome defects such as poor robustness of patterns, complexity in process machining, great increase in device cost due to a need for introducing a new device on a production line, as well as adverse effects on layout of a mass production line and process dispensing, which are easily caused when an electrode material is patterned with an ink-jet printing method or a silk-screen printing method.

To solve the above problems, one aspect of the present invention provides a conductive bridging method, comprising:

providing a base substrate;

forming first electrode lines and second electrode lines, which mutually intersect, on the base substrate, wherein the second electrode lines are interrupted at positions where they intersect the first electrode lines;

sequentially forming an insulating layer and a self-assembled-monolayer on the base substrate provided with the first electrode lines and the second electrode lines;

forming via holes penetrating through the insulating layer and the self-assembled-monolayer;

removing the self-assembled-monolayer between two adjacent via holes close to a same first electrode line;

filling a conductive dispersion liquid in the via holes and a region between the two adjacent via holes; and treating the conductive dispersion liquid to form a conductive film.

As used herein, "penetrate" means that the relevant via holes not only penetrate through the insulating layer and the self-assembled-monolayer, but also extend onto a surface of a second electrode.

Preferably, the conductive bridging method further comprises, after forming the conductive film, forming a protective layer covering above the conductive film.

Preferably, the step of forming via holes penetrating through the insulating layer and the self-assembled-monolayer particularly comprises:

coating a photoresist on the insulating layer and the self-assembled-monolayer; and forming the via holes penetrating through the insulating layer and the self-assembled-monolayer above the second electrode lines close to the first electrode lines in an intersection region by means of exposure and development.

Preferably, the insulating layer is made of silicon dioxide.

Preferably, the conductive bridging method further comprises, after forming the insulating layer, hydroxylating the silicon dioxide.

Preferably, the hydroxylating process is done with a concentrated sulfuric acid-hydrogen peroxide soaking method.

Preferably, the self-assembled-monolayer is made of any one of octyl-trichlorosilane, octadecyl-trichlorosilane, hexamethyl-disilazane or fluorinated silane.

Preferably, the conductive dispersion liquid is made of any one of a poly(3,4-ethylenedioxythiophene)-poly(styrenesulfonate) (hereafter indicated as PEDOT:PSS) dispersion liquid, a mixed dispersion liquid obtained by mixing dimethyl-sulfoxide or ethylene glycol in the poly(3,4-ethylenedioxythiophene)-poly(styrenesulfonate) dispersion liquid, a carbon nano tube dispersion liquid, a silver nanowire dispersion liquid or a graphene oxide dispersion liquid.

Preferably, the step of treating the conductive dispersion liquid to form a conductive film comprises: annealing the conductive dispersion liquid, wherein an annealing temperature is between 150° C. and 250° C., and an annealing time is between 1 h and 2 h.

Preferably, the protective layer is made of any one of silicon dioxide, silicon nitride, silicon oxynitride, polyimide, polymethyl methacrylate and polystyrene.

Preferably, the step of filling the conductive dispersion liquid comprises: shearing excessive conductive dispersion liquid by a shearing apparatus to control a thickness of the filled conductive dispersion liquid; or, filling the conductive dispersion liquid in the via holes and a region between the two adjacent via holes with a spin-coating method or a dip-coating method.

Another aspect of the present invention further provides a conductive bridging structure, comprising:

a base substrate provided with first electrode lines and second electrode lines which mutually intersect, wherein the second electrode lines are interrupted at positions where they intersect the first electrode lines;

an insulating layer formed on the base substrate provided with the first electrode lines and the second electrode lines;

a self-assembled-monolayer formed on the insulating layer;

via holes penetrating through the insulating layer and the self-assembled-monolayer, wherein the via holes are located above the second electrode lines close to the first electrode lines in an intersection region; and a conductive film formed in the via holes as well as in a region between two adjacent via holes located in the intersection region.

Preferably, the conductive bridging structure further comprises a protective layer covering above the conductive film.

Preferably, the protective layer is made of any one of silicon dioxide, silicon nitride, silicon oxynitride, polyimide, polymethyl methacrylate and polystyrene.

Preferably, the insulating layer is made of silicon dioxide.

Preferably, the silicon dioxide is hydroxylated with a concentrated sulfuric acid-hydrogen peroxide soaking method.

Preferably, the self-assembled-monolayer is made of any one of octyl-trichlorosilane, octadecyl-trichlorosilane, hexamethyl-disilazane or trichloro(1H,1H,2H,2H-heptadecafluorodecyl)silane.

Preferably, the conductive film is made of any one of a poly(3,4-ethylenedioxythiophene)-poly(styrenesulfonate) dispersion liquid, a mixed dispersion liquid obtained by mixing dimethyl-sulfoxide or ethylene glycol in the poly(3,4-ethylenedioxythiophene)-poly(styrenesulfonate) dispersion liquid, a carbon nano tube dispersion liquid, a silver nanowire dispersion liquid or a graphene oxide dispersion liquid.

Yet another aspect of the present invention further provides a touch panel, comprising the above conductive bridging structure.

Yet another aspect of the present invention further provides a touch control display apparatus, comprising the above touch panel.

The present invention provides a conductive bridging method, a bridging structure, a touch panel and a touch control display apparatus. By perforating via holes through an insulating layer and a self-assembled-monolayer and making a conductive dispersion liquid automatically repel a region of the self-assembled-monolayer but stay in a bridging region without the self-assembled-monolayer, a bridging connection will be achieved by automatically filling via holes with the conductive dispersion liquid. In this way, a technical solution of the present invention is simple in operation process, and distinct and stable in pattern quality, thereby greatly reducing the process cost and improving the product quality. Because an optical transmittance of the conductive dispersion liquid is higher than that of a metal structure employed by a traditional process, an optical transmittance of a touch module may be effectively improved when the conductive dispersion liquid is used as a transparent conductive film. In addition, fabricating the transparent conductive film by means of a dispersion liquid method also facilitates a large-area manufacturing process for a touch screen.

LIST OF THE REFERENCE NUMBERS 1. base substrate;
2. second electrode line;
3. first electrode line;
4. insulating layer;
5. self-assembled-monolayer;
6. photoresist;
7. conductive dispersion liquid;
8. protective layer;
9. via hole;
10. bridging position;
11. conductive film.

DETAILED DESCRIPTION OF THE INVENTION

The detailed description of the present invention will be further explained below in detail in connection with drawings and embodiments. The following embodiments are intended to illustrate the present invention, but not to limit a scope thereof.

Figure 1:
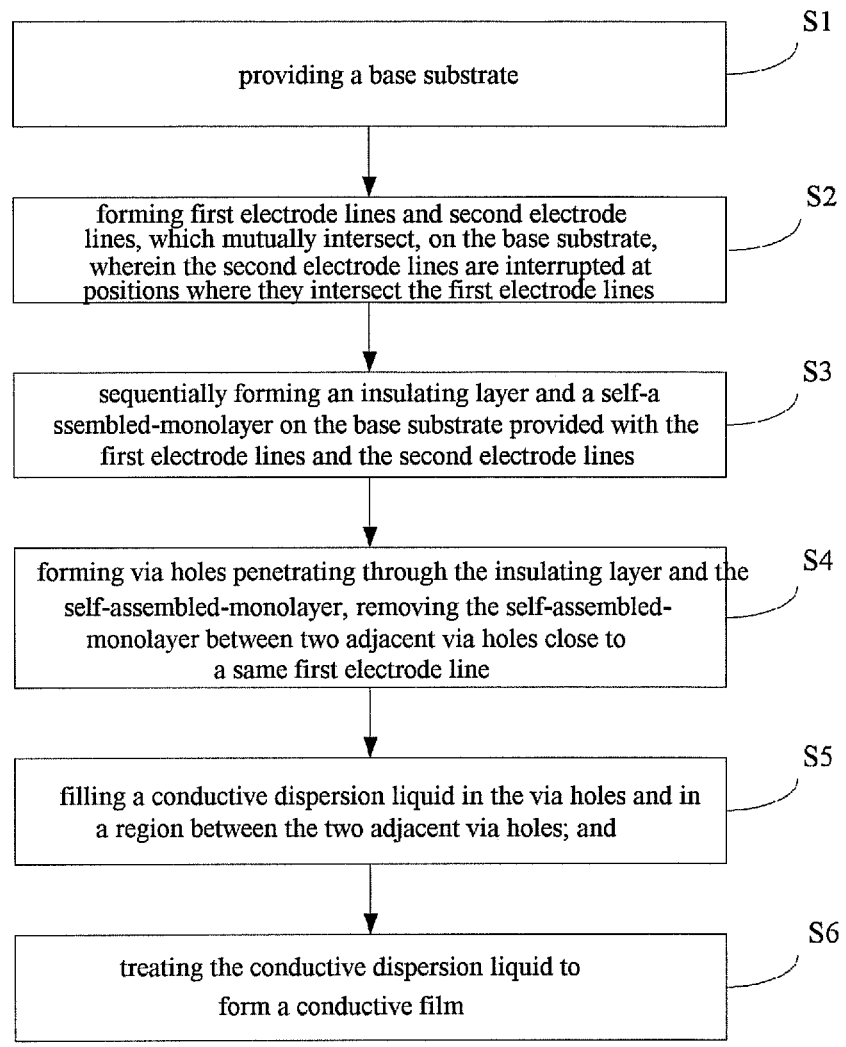
FIG. 1 is a flowchart for a conductive bridging method according to an embodiment of the present invention.

As shown in FIG. 1, the present invention provides a conductive bridging method, specifically comprising:

step 1, providing a base substrate 1;

step 2, forming first electrode lines 3 and second electrode lines 2, which mutually intersect, on the base substrate 1, wherein the second electrode lines 2 are interrupted at positions where they intersect the first electrode lines 3;

step 3, sequentially forming an insulating layer 4 and a self-assembled-monolayer 5 on the base substrate provided with the first electrode lines 3 and the second electrode lines 2;

step 4, forming via holes 9 penetrating through the insulating layer 4 and the self-assembled-monolayer 5, removing the self-assembled-monolayer 5 between two adjacent via holes 9 close to a same first electrode line 3;

step 5, filling a conductive dispersion liquid 7 in the via holes 9 and in a region between the two adjacent via holes 9; and step 6, treating the conductive dispersion liquid 7 to form a conductive film.

The conductive bridging method will be illustrated in detail below.

On the base substrate provided in step S1, structures of the first electrode lines 3 and the second electrode lines 2 in step S2 is formed according to a specific requirement.

In step S3, sequentially forming an insulating layer 4 and a self-assembled-monolayer 5 on the base substrate provided with the first electrode lines 3 and the second electrode lines 2.

Figure 2:
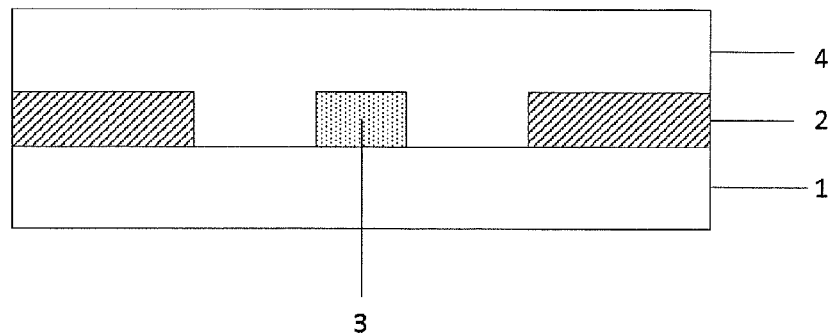
FIGS. 2-11 are schematic views for specific fabricating steps of a conductive bridging method according to an embodiment of the present invention.
Figure 3:
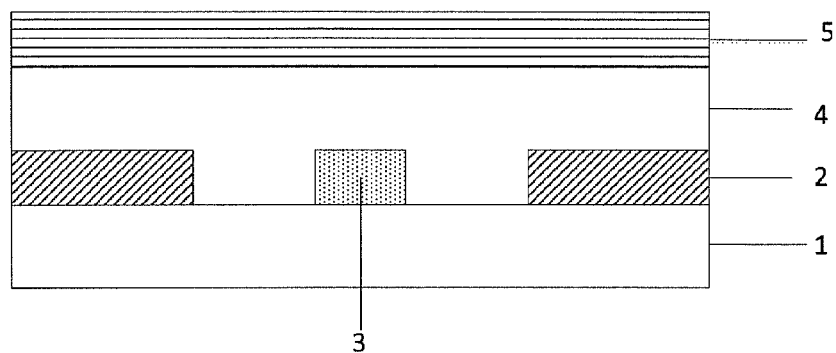
Figure 4:
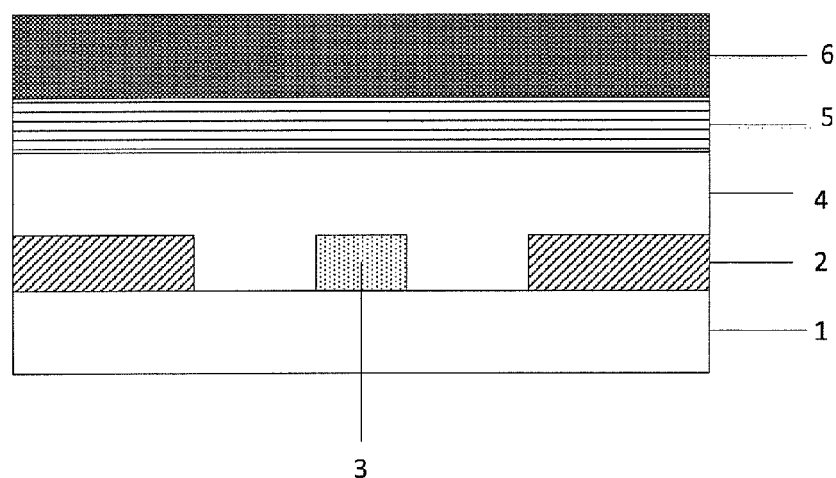
Figure 5:
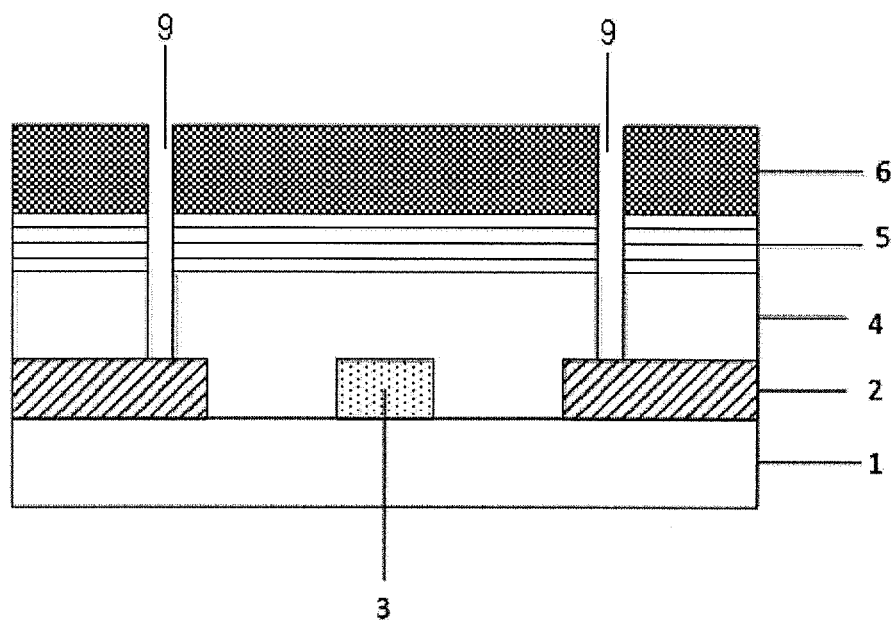
Figure 6:
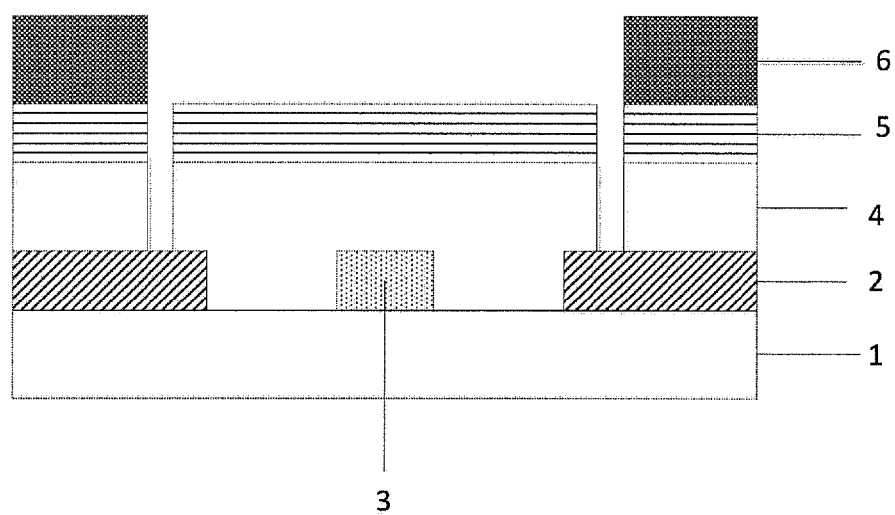
Figure 7:
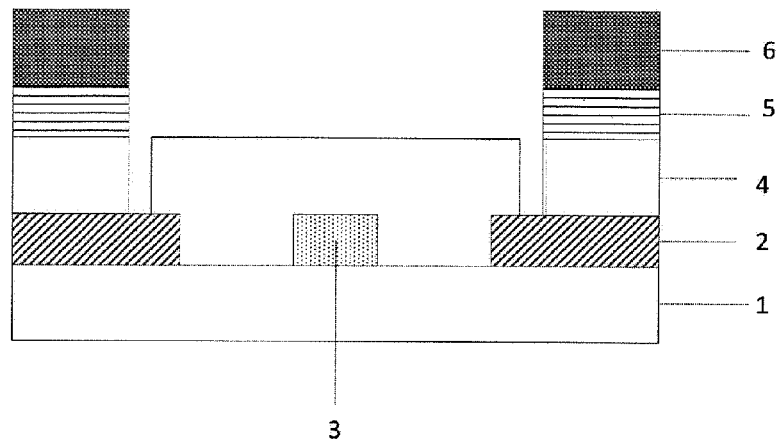
Figure 8:
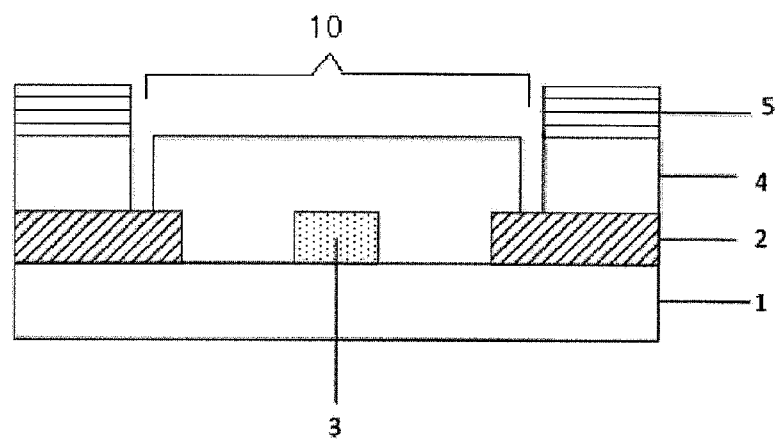

For step S3, as shown in FIG. 2 and FIG. 3, firstly, evaporating and coating the insulating layer 4 on the base substrate provided with the first electrode lines 3 and the second electrode lines 2. In this embodiment, the insulating layer 4 is made of silicon dioxide. Thereafter, the silicon dioxide may be hydroxylated to improve a hydroxylation degree of the silicon dioxide surface.

Hydroxylation for the silicon dioxide is preferably done with a concentrated sulfuric acid-hydrogen peroxide soaking method. Certainly, in addition to the concentrated sulfuric acid-hydrogen peroxide soaking method, the silicon dioxide may be hydroxylated with other methods known in the prior art. Subsequently, a self-assembled-monolayer (SAM) 5 is fabricated on the silicon dioxide surface. A material for fabricating SAM may be octyl-trichlorosilane, octadecyl-trichlorosilane, hexamethyl-disilazane, trichloro(1H,1H,2H,2H-heptadecafluorodecyl)silane or other self-assembled-monolayer materials capable of reducing the surface energy of the substrate. Correspondingly, when the SAM is fabricated by the octyl-trichlorosilane and the octadecyl-trichlorosilane, assembly for the self-assembled-monolayer may be achieved with a solution soaking method. When the SAM is fabricated by the hexamethyl-disilazane, assembly for the self-assembled-monolayer may be achieved with a spin-coating method. Moreover, when the SAM is fabricated by the trichloro(1H,1H,2H,2H-heptadecafluorodecyl)silane, assembly for the self-assembled-monolayer may be achieved with a vacuum vaporization method.

The self-assembled-monolayer 5 made of the above material may form a chemical bond with a hydroxyl on the silicon dioxide surface, thereby reducing the surface energy of the silicon dioxide surface.

For step S4, forming via holes 9 penetrating through the insulating layer 4 and the self-assembled-monolayer 5, removing the self-assembled-monolayer 5 between two adjacent via holes 9 close to a same first electrode line 3.

As shown in FIGS. 4-8, step S4 specifically comprises:
coating a photoresist 6 (a positive photoresist is used as the photoresist in this embodiment) on the insulating layer 4 and the self-assembled-monolayer 5, and forming the via holes 9 penetrating through the insulating layer 4 and the self-assembled-monolayer 5 above the second electrode lines 2 close to the first electrode lines 3 in the intersection region by means of exposure and development. These via holes 9 penetrate through bottoms of the insulating layer 4 and the self-assembled-monolayer 5, and extend to surfaces of the second electrode lines 2. Subsequently, removing the photoresist 6 between two adjacent via holes close to a same first electrode line 3, with specific reference to FIG. 6. After that, the self-assembled-monolayer 5 between two adjacent via holes 9 close to a same first electrode line 3 is further removed, with specific reference to FIG. 7.

In the above step, via holes are perforated through a silicon dioxide layer by a dry etching process. Because the photoresist is a positive photoresist, secondary exposure may be performed to remove the photoresist between two adjacent via holes close to a same first electrode line (at a bridging position 10). After the photoresist at the bridging position 10 is removed, the SAM at the bridging position 10 will be removed by means of UV-OZONE, and then the remaining photoresist is removed.

It is noted that, because the SAM is bound with the hydroxyl on the silicon dioxide surface in a form of chemical bond, the photoresist, a developing liquid and a stripping liquid do not affect the SAM during a processes for making the photoresist and removing the photoresist.

For step S5, filling a conductive dispersion liquid 7 in the via holes 9 and in a region between the two adjacent via holes 9.

In this step S5, specifically, pouring the conductive dispersion liquid 7 on the base material subjected to previous several steps, wherein the conductive dispersion liquid 7 is deposited on a region other than the self-assembled-monolayer. Two adjacent second electrode lines will be bridged by the conductive dispersion liquid 7 deposited in the via holes as well as the conductive dispersion liquid in the region between two adjacent via holes (at the bridging position 10).

Figure 9:
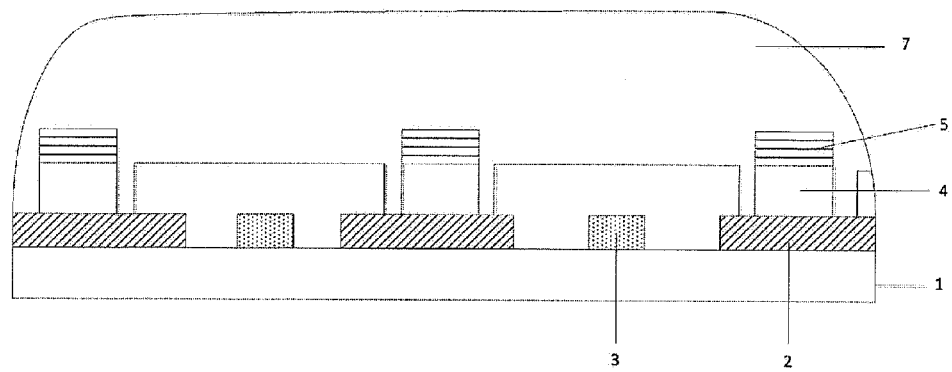
Figure 10:
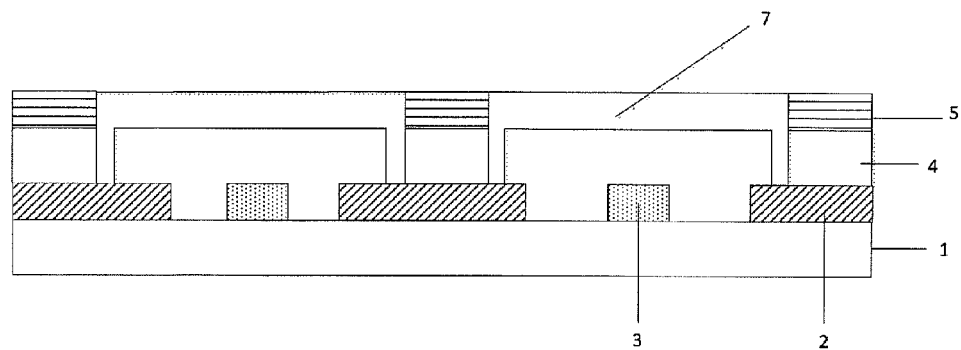
Figure 11:
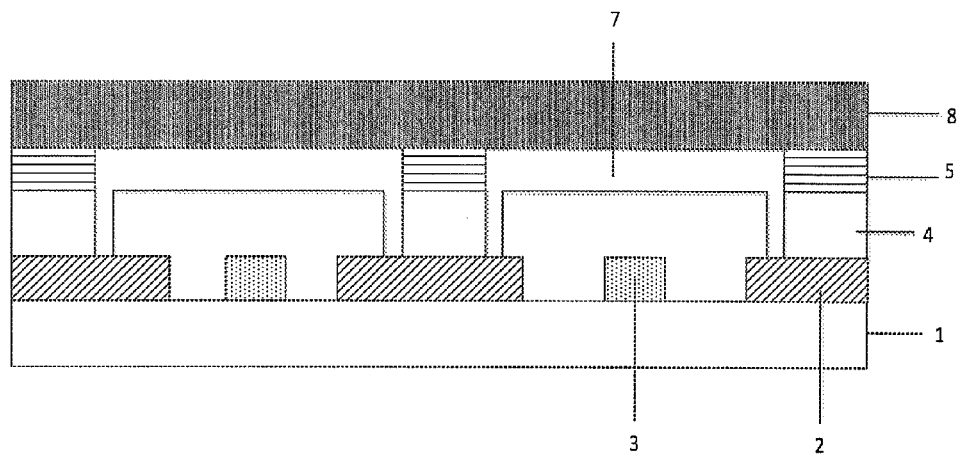

As shown in FIGS. 9 and 10, a PEDOT:PSS dispersion liquid is preferably used as the conductive dispersion liquid 7 in this step S5. The PEDOT:PSS dispersion liquid belongs to an organic conductive material, and has advantages such as good water solubility, good environmental stability of the film, good electrical conductivity, high transmittance and the like, and may perform dispersion liquid processing, thereby being very suitable for the field of a touch screen.

In a PEDOT:PSS dispersion liquid system, water serves as the main dispersing agent, and is relatively high in tension. When assembling a self-assembled-monolayer material, a hydroxyl structure is formed by reaction with the hydroxyl on the silicon dioxide surface, and the hydroxyl structure is hydrophobic. Thus, when a PEDOT:PSS dispersion liquid is poured above the silicon dioxide surface, it can not stay on the hydrophobic SAM but only stay in a hydrophilic region without SAM. That is, the PEDOT:PSS dispersion liquid may repel a region where the SAM is located but stay in a region without SAM, thereby automatically filling the via holes and achieving bridging.

It is noted that, in addition to the PEDOT:PSS dispersion liquid, the conductive dispersion liquid in this embodiment may also employ any one of a mixed dispersion liquid obtained by mixing dimethyl sulfoxide or ethylene glycol in the PEDOT:PSS dispersion liquid, a carbon nano tube dispersion liquid, a silver nanowire dispersion liquid or a graphene oxide dispersion liquid. It should be noted that, it is needed to perform a reduction reaction on a graphene oxide thin film, if the graphene oxide dispersion liquid is used. That is, the graphene oxide thin film is oxidized by soaking in hydrazine hydrate at 85° C., so that the graphene oxide thin film is reduced to a graphene thin film.

For step S6, treating the conductive dispersion liquid to form a conductive film.

Particularly, in this step S6, the conductive dispersion liquid is treated into the conductive film by an annealing process. Annealing conditions are specifically as follows: an annealing temperature is 200° C. and time is 1 h, thus rendering the PEDOT:PSS dispersion liquid cured into the conductive film.

It is noted that, the PEDOT:PSS dispersion liquid has a certain viscosity. Therefore, an amount of the PEDOT:PSS dispersion liquid staying on a substrate may be determined with an additional shearing apparatus (for example, a scraper), thereby controlling a thickness of a PEDOT:PSS thin film. Particularly, when the PEDOT:PSS dispersion liquid is accumulated to a certain thickness, the conductive dispersion liquid exceeding the thickness will be sheared by a shearing knife. As shown in FIG. 9, after the PEDOT:PSS dispersion liquid is poured on the treated substrate, if the amount of the PEDOT:PSS dispersion liquid is relatively large, the scraper may be used to scrape the dispersion liquid from one end to the other end of the substrate. During this process, the dispersion liquid will stay in a region without the self-assembled-monolayer, and the dispersion liquid in a region with self-assembled-monolayer will be scraped away by the scraper. Certainly, in addition to the shearing apparatus, the PEDOT:PSS dispersion liquid which may not stay can be thrown away by a spin-coating method. Certainly, a dip-coating method may also be employed, wherein a base material is first soaked in the conductive dispersion liquid and then dip-coated to form a film. A particular case may be determined according to a process requirement.

In addition, this embodiment further comprises a step of, after forming the conductive film, forming a protective layer 8 covering above the conductive film.

Figure 12:
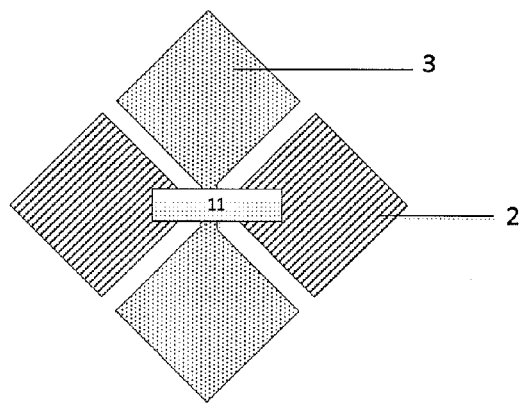
FIG. 12 is a schematic structural plan view for a conductive bridging structure according to an embodiment of the present invention.

As shown in FIG. 12, the conductive film is protected by fabricating the protective layer 8 above the base substrate subjected to previous several steps, so as to avoid influence by a subsequent lamination process. It is significantly noted that the conductive film is difficulty soluble in most solvents other than water, and is also resistant in high temperature. However, for the sake of safety, the protective layer 8 may be alternatively a transparent inorganic insulating material, such as silicon dioxide, silicon nitride and silicon oxynitride, and also alternatively may be a high-transmittance organic insulating material, such as polyimide PI, polymethyl methacrylate PMMA and polystyrene PS.

Figure 13:
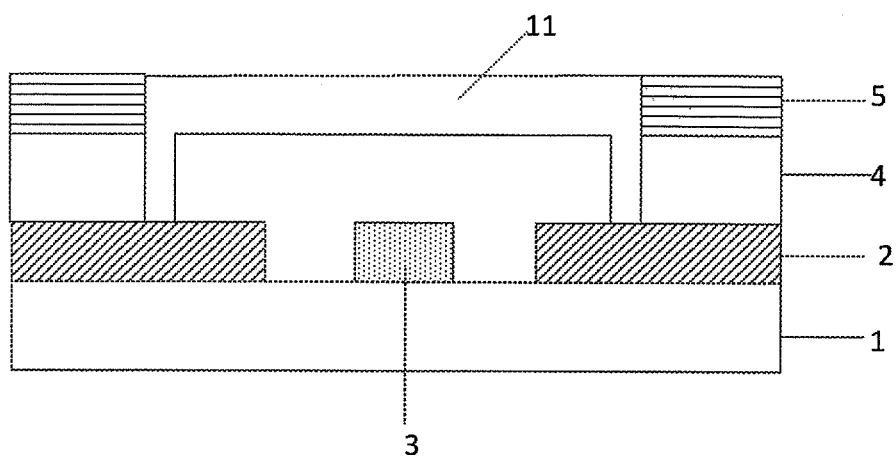
FIG. 13 is a schematic structural sectional view for a conductive bridging structure according to an embodiment of the present invention.

As shown in FIGS. 12 and 13, the present invention further provides a conductive bridging structure, which comprises:

a base substrate 1 provided with first electrode lines 3 and second electrode lines 2 which mutually intersect, wherein the second electrode lines 2 are interrupted at positions where they intersect the first electrode lines 3;

an insulating layer 4 formed on the first electrode lines 3 and the second electrode lines 2;

a self-assembled-monolayer 5 formed on the insulating layer 4;

via holes 9 penetrating through the insulating layer 4 and the self-assembled-monolayer 5, wherein the via holes 9 are located above the second electrode lines 2 close to the first electrode lines 3 in an intersection region; and a conductive film 11 formed in the via holes 9 as well as in a region between two adjacent via holes 9 located in the intersection region.

The conductive bridging structure may further comprise a protective layer 8, wherein the protective layer 8 is located on an outermost layer of the bridging structure.

Particularly, the protective layer 8 is made of any one of silicon dioxide, silicon nitride, silicon oxynitride, polyimide PI, polymethyl methacrylate PMMA and polystyrene PS.

Particularly, the insulating layer 4 is made of silicon dioxide. Moreover, the silicon dioxide may further be hydroxylated. The hydroxylation method is particularly done with a concentrated sulfuric acid-hydrogen peroxide soaking method.

Particularly, the self-assembled-monolayer 5 is made of any one of octyl-trichlorosilane, octadecyl-trichlorosilane, hexamethyl-disilazane, trichloro(1H,1H,2H,2H-heptadeca-fluorodecyl)silane or other self-assembled-monolayer material capable of reducing the surface energy of the substrate. Further, the conductive film 11 is formed by applying an annealing process to the PEDOT:PSS dispersion liquid or a mixed dispersion liquid obtained by mixing dimethyl sulfoxide or ethylene glycol in the PEDOT:PSS dispersion liquid.

In the conductive bridging structure provided by the present invention, by perforating via holes through the insulating layer and the self-assembled-monolayer to enable the via holes penetrate through the insulating layer and the self-assembled-monolayer, and forming the conductive film in the via holes and in the region between two adjacent via holes located in the intersection region, a bridging connection is achieved. Therefore, a technical solution of the present invention is simple in operation process, and distinct and stable in pattern quality, thereby reducing the process cost and improving the product quality.

In addition, the present invention further provides a touch panel, comprising the above conductive bridging structure.

In addition, the present invention further provides a touch control display apparatus, comprising the above touch panel. The display apparatus may be a tablet television, a tablet personal computer, a mobile phone, an electronic book, and other electronic products.

The forgoing is merely a preferred embodiment of the present invention. It will be appreciated by those ordinarily skilled in the art that several improvements and substitutions may be made without departing from a technical principle of the present invention, and these improvements and substitutions should be considered to be encompassed within a protection scope of the present invention.

The invention claimed is:

1. A conductive bridging method, comprising:
   providing a base substrate;
   forming first electrode lines and second electrode lines, which mutually intersect, on said base substrate, wherein said second electrode lines are interrupted at positions where they intersect said first electrode lines;
   sequentially forming an insulating layer and a self-assembled-monolayer on said base substrate provided with said first electrode lines and said second electrode lines;
   forming via holes penetrating through said insulating layer and said self-assembled-monolayer;
   removing the self-assembled-monolayer between two adjacent via holes close to a same first electrode line;

filling a conductive dispersion liquid in said via holes and a region between said two adjacent via holes; and treating said conductive dispersion liquid to form a conductive film.

2. The conductive bridging method according to claim 1, further comprising:

after forming said conductive film, forming a protective layer covering above said conductive film.

3. The conductive bridging method according to claim 2, wherein said protective layer is made of any one of silicon dioxide, silicon nitride, silicon oxynitride, polyimide, polymethyl methacrylate and polystyrene.

4. The conductive bridging method according to claim 1, wherein the step of forming via holes penetrating through said insulating layer and said self-assembled-monolayer comprises:

coating a photoresist on said insulating layer and said self-assembled-monolayer; and forming via holes penetrating through said insulating layer and said self-assembled-monolayer above the second electrode lines close to the first electrode lines in an intersection region by means of exposure and development.

5. The conductive bridging method according to claim 1, wherein said insulating layer is made of silicon dioxide.

6. The conductive bridging method according to claim 5, further comprising:

after forming the insulating layer, hydroxylating said silicon dioxide.

7. The conductive bridging method according to claim 6, wherein said hydroxylating is done by a concentrated sulfuric acid-hydrogen peroxide soaking method.

8. The conductive bridging method according to claim 1, wherein said self-assembled-monolayer is made of any one of octyl-trichlorosilane, octadecyl-trichlorosilane, hexamethyl-disilazane or trichloro(1H, 1H,2H,2H-heptadecafluorodecyl)silane.

9. The conductive bridging method according to claim 1, wherein said conductive dispersion liquid is made of any one of a poly(3,4-ethylenedioxythiophene)-poly(styrenesulfonate) dispersion liquid, a mixed dispersion liquid obtained by mixing dimethyl sulfoxide or ethylene glycol in said poly(3,4-ethylenedioxythiophene)-poly(styrenesulfonate) dispersion liquid, a carbon nano tube dispersion liquid, a silver nanowire dispersion liquid or a graphene oxide dispersion liquid.

10. The conductive bridging method according to claim 1, wherein the step of treating said conductive dispersion liquid to form a conductive film comprises:

annealing said conductive dispersion liquid, wherein an annealing temperature is 150° C.-250° C., and an annealing time is 1 h-2 h.

11. The conductive bridging method according to claim 1, wherein the step of filling said conductive dispersion liquid comprises:

shearing excessive conductive dispersion liquid by a shearing apparatus to control a thickness of the filled conductive dispersion liquid; or filling a conductive dispersion liquid in said via holes and a region between said two adjacent via holes by a spin-coating method or a dip-coating method.

12. A conductive bridging structure, comprising:

a base substrate provided with first electrode lines and second electrode lines which mutually intersect, wherein said second electrode lines are interrupted at positions where they intersect said first electrode lines;

an insulating layer formed on said base substrate provided with said first electrode lines and said second electrode lines;

a self-assembled-monolayer formed on said insulating layer;

via holes penetrating through said insulating layer and said self-assembled-monolayer, wherein said via holes are located above the second electrode lines close to the first electrode lines in an intersection region; and a conductive film formed in said via holes as well as in a region between two adjacent via holes located in the intersection region.

13. The conductive bridging structure according to claim 12, further comprising a protective layer covering above said conductive film.

14. The conductive bridging structure according to claim 13, wherein said protective layer is made of any one of silicon dioxide, silicon nitride, silicon oxynitride, polyimide, polymethyl methacrylate and polystyrene.

15. The conductive bridging structure according to claim 12, wherein said insulating layer is made of silicon dioxide.

16. The conductive bridging structure according to claim 15, wherein said silicon dioxide is hydroxylated by a concentrated sulfuric acid-hydrogen peroxide soaking method.

17. The conductive bridging structure according to claim 12, wherein said self-assembled-monolayer is made of any one of octyl-trichlorosilane, octadecyl-trichlorosilane, hexamethyl-disilazane or trichloro(1H,1H,2H,2H-heptadecafluorodecyl)silane.

18. The conductive bridging structure according to claim 12, wherein said conductive film is made of any one of a poly(3,4-ethylenedioxythiophene)-poly(styrenesulfonate) dispersion liquid, a mixed dispersion liquid obtained by mixing dimethyl sulfoxide or ethylene glycol in said poly(3,4-ethylenedioxythiophene)-poly(styrenesulfonate) dispersion liquid, a carbon nano tube dispersion liquid, a silver nanowire dispersion liquid or a graphene oxide dispersion liquid.

19. A touch panel, comprising the conductive bridging structure according to of claim 12.

20. A touch control display apparatus, comprising the touch panel according to claim 19.

* * * * *